(12) United States Patent
MacKenzie

(10) Patent No.: US 8,707,618 B2
(45) Date of Patent: *Apr. 29, 2014

(54) MODULAR PLANTING SYSTEM FOR ROOF APPLICATIONS

(71) Applicant: Hortech, Inc., Nunica, MI (US)

(72) Inventor: David S. MacKenzie, Nunica, MI (US)

(73) Assignee: Hortech, Inc., Nunica, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,002

(22) Filed: Mar. 6, 2013

(65) Prior Publication Data

US 2013/0180174 A1 Jul. 18, 2013

Related U.S. Application Data

(63) Continuation-in-part of application No. 11/623,168, filed on Jan. 15, 2007, and a continuation-in-part of application No. 12/553,582, filed on Sep. 3, 2009, now Pat. No. 8,555,546, and a continuation-in-part of application No. 13/093,458, filed on Apr. 25, 2011, now abandoned.

(51) Int. Cl.
*A01G 9/02* (2006.01)

(52) U.S. Cl.
USPC .............................. 47/65.9; 47/65.7; 47/66.5

(58) Field of Classification Search
USPC .............. 47/65.9, 66.1, 73, 77, 86, 65.7, 66.5
See application file for complete search history.

(56) References Cited

U.S. PATENT DOCUMENTS

| 84,002 A | 11/1868 | Ryder |
| 1,557,712 A | 10/1925 | Little |
| 1,665,124 A | 4/1928 | Wright |
| 2,423,724 A | 7/1947 | Paxton |
| 2,567,706 A | 9/1951 | Hannum et al. |
| 2,655,283 A | 10/1953 | Moldt |
| 2,827,217 A | 3/1958 | Clement |
| 2,949,699 A | 8/1960 | Lapetina et al. |
| 3,386,608 A | 6/1968 | Diller |
| 3,651,976 A | 3/1972 | Chadbourne |
| 3,947,995 A | 4/1976 | Renfro |
| 4,047,329 A * | 9/1977 | Holt ............................... 47/65.7 |
| 4,058,930 A | 11/1977 | Miles |
| 4,111,585 A | 9/1978 | Mascaro |
| 4,111,892 A | 9/1978 | Kamada et al. |
| 4,118,892 A | 10/1978 | Nakamura et al. |

(Continued)

FOREIGN PATENT DOCUMENTS

| DE | 3535448 | 4/1987 |
| DE | 3712867 | 11/1988 |

(Continued)

Primary Examiner — Monica Williams
(74) Attorney, Agent, or Firm — Price Heneveld LLP

(57) ABSTRACT

A green roof planter module includes a planter including a bottom wall, a plurality of sidewalls each including an upper portion and a lower portion, wherein the bottom wall and the plurality of sidewalls cooperate with one another to form an interior space, and a biodegradable collar member extending upwardly from at least a select one of the biodegradable sidewalls, wherein at least a portion of the collar member is in-molded within the upper portion of at least one of the sidewalls, and wherein the collar member is adapted to retain a plant matter that extends above the plurality of sidewalls.

16 Claims, 7 Drawing Sheets

(56) References Cited

U.S. PATENT DOCUMENTS

| | | | |
|---|---|---|---|
| 4,926,586 | A | 5/1990 | Nagamatsu |
| 4,999,946 | A | 3/1991 | DeGiglio et al. |
| 5,022,183 | A | 6/1991 | Bohlmann |
| 5,161,710 | A | 11/1992 | Chumley |
| 5,187,894 | A | 2/1993 | Ripley, Sr. et al. |
| 5,309,846 | A | 5/1994 | Peterson |
| 5,315,786 | A | 5/1994 | Smith |
| 5,419,080 | A | 5/1995 | Buss et al. |
| RE35,006 | E | 8/1995 | Ripley et al. |
| 5,437,698 | A | 8/1995 | Furukawa |
| 5,467,555 | A | 11/1995 | Ripley, Sr. et al. |
| 5,519,080 | A | 5/1996 | Matsushita et al. |
| 5,581,936 | A | 12/1996 | Belgiomo |
| 5,585,150 | A | 12/1996 | Sheehan |
| 5,595,021 | A | 1/1997 | Ripley, Sr. et al. |
| 5,673,513 | A | 10/1997 | Casimaty |
| 5,953,859 | A | 9/1999 | Cochran et al. |
| 6,178,690 | B1 | 1/2001 | Yoshida et al. |
| 6,237,285 | B1 | 5/2001 | Yoshida et al. |
| 6,536,361 | B1 | 3/2003 | Wu |
| 6,581,329 | B1 | 6/2003 | Eriksson |
| 6,606,823 | B1 | 8/2003 | McDonough et al. |
| 6,694,672 | B1 | 2/2004 | Hergeth |
| 6,711,851 | B2 | 3/2004 | Mischo |
| 6,862,842 | B2 | 3/2005 | Mischo |
| 6,904,716 | B2 | 6/2005 | Weder et al. |
| 7,387,823 | B2 | 6/2008 | Waterford |
| 2004/0040209 | A1 | 3/2004 | Layt et al. |
| 2004/0081771 | A1 | 4/2004 | Waterford |
| 2005/0155287 | A1 | 7/2005 | Phillips |
| 2007/0094927 | A1 | 5/2007 | Perry |
| 2007/0261299 | A1 | 11/2007 | Kephart |
| 2008/0092441 | A1 | 4/2008 | St. Clair et al. |
| 2008/0168710 | A1 | 7/2008 | MacKenzie |
| 2009/0320364 | A1 | 12/2009 | MacKenzie |
| 2011/0030274 | A1 | 2/2011 | Buist |
| 2011/0289839 | A1 | 12/2011 | Cronk et al. |
| 2012/0227319 | A1 | 9/2012 | Jaslow |
| 2012/0240463 | A1 | 9/2012 | Bindschedler et al. |

FOREIGN PATENT DOCUMENTS

| | | |
|---|---|---|
| FR | 2703213 | 10/1994 |
| GB | 399175 | 2/1933 |
| GB | 882951 | 10/1960 |
| GB | 2074433 | 11/1981 |
| GB | 2138690 | 10/1985 |
| GB | 2157534 | 10/1985 |
| JP | 11-155369 | 6/1999 |

* cited by examiner

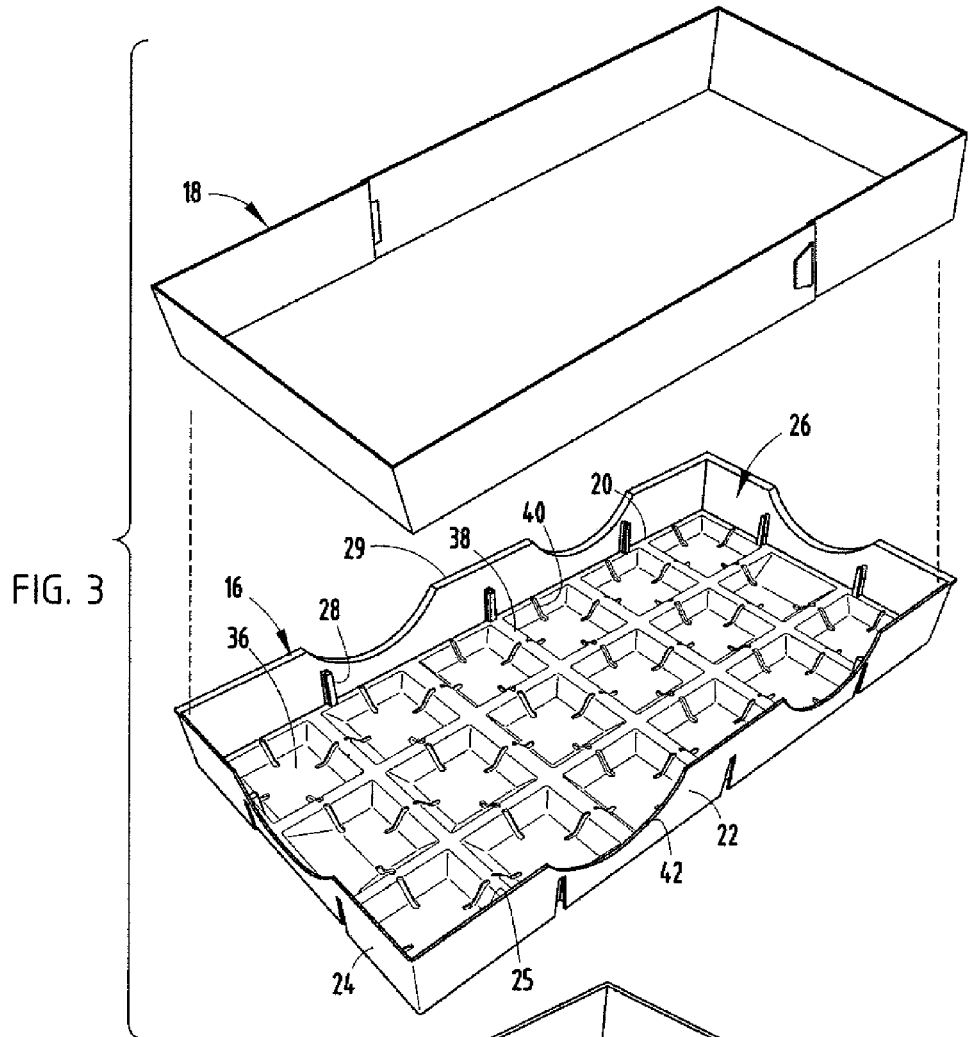
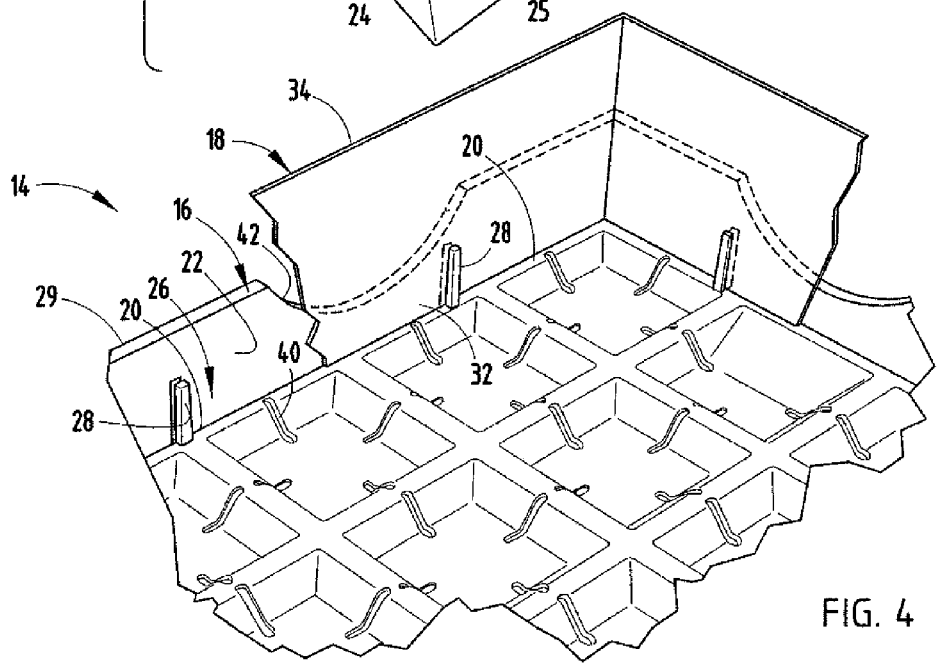
FIG. 3
FIG. 4

US 8,707,618 B2

MODULAR PLANTING SYSTEM FOR ROOF APPLICATIONS

BACKGROUND OF THE INVENTION

The present invention relates to a modular planting system for roof applications, and in particular to a modular planting system that includes a plurality of planter modules each including a planter and a biodegradable collar member extending upwardly from an uppermost portion of the planter, thereby allowing plant matter to extend above the upper edge of the associated planter and the biodegradable collar to degrade once the planter module is placed adjacent to a plurality of other planter modules, thereby creating a green-roof system.

Green-roof systems are used in a wide variety of applications, including commercial and residential buildings. The positive thermal properties of the systems result in significant cost savings with respect to cooling of the associated buildings and structures. Further, the systems dramatically reduce the amount of water runoff caused by rainfall, which is particularly critical in urban areas. The systems typically include a soil or aggregate matter supporting plants therein, and barrier layers for protecting the underlying roof and for providing the necessary water barriers and drainage for the associated plants. These methods typically include the application of seed or cuttings, to the soil upon the roof area. However, these methods typically require a significant amount of time for plant establishment and coverage. Other methods that have been employed include the use of modular systems, which can be vegetated with plant matter, at a nursery before placement on the rooftop, thereby reducing grow-time, and improving plant establishment. However, modular systems employ planter boxes wherein the plant matter rests below an uppermost edge of the associated planter or container. Such methods, while a vast improvement over previous methods, typically result in several months to years of grow time while the individual sections grow and subsequently fuse together to provide adequate roof coverage.

A planted roof system is desired that provides adequate roof coverage quickly and economically, while simultaneously being easy to install at a relative low cost.

SUMMARY OF THE INVENTION

One aspect of the present invention is to provide a green roof planter module comprising a planter including a bottom wall, a plurality of sidewalls each including an upper portion and a lower portion, wherein the bottom wall and the plurality of sidewalls cooperate with one another to form an interior space, and a biodegradable member extending upwardly from at least a select one of the plurality of sidewalls, wherein at least a portion of the collar member is in-molded within the upper portion of at least one of the sidewalls, and wherein the collar member is adapted to retain a plant matter that extends above the plurality of sidewalls.

Another aspect of the present invention is to provide a method for installing a modular green roof system that comprises providing a biodegradable collar member having an upper portion and a lower portion, molding a planter that includes a bottom wall and a plurality of sidewalls each having an upper portion and an uppermost edge, wherein the bottom wall and the plurality of sidewalls cooperate to form an interior space, and in-molding the lower portion of the biodegradable collar member within an upper portion of at least one of the sidewalls of the planter as the planter is molded such that the biodegradable collar extends upwardly from at least a select one of the plurality of sidewalls. The method further includes placing and growing a plant matter within the interior space of the planter such that at least a portion of the plant matter extends upward from the uppermost edge of at least one of the plurality of sidewalls, and positioning the planter proximate to at least one other planter.

Another aspect of the present invention is to provide a green roof planter module comprising a planter including a bottom wall and a plurality of sidewalls that cooperate with the bottom wall to form an interior space, and a biodegradable insert including a plurality of sidewalls that cooperate with one another to form an interior space, wherein the insert is adapted to retain plant matter in the interior space of the insert, the plurality of sidewalls of the insert extending above the plurality of sidewalls of the planter, and wherein the plurality of sidewalls of the insert are adapted to retain the plant matter that extends above the plurality of sidewalls of the planter.

Still yet another aspect of the present invention is to provide a method for installing a modular green roof system that comprises providing a planter that includes a bottom wall and a plurality of sidewalls each having an upper edge and that cooperate with the bottom wall to form an interior space, providing a biodegradable insert that includes a plurality of sidewalls each having an upper edge that cooperate with one another to form an interior space, and inserting the insert into the interior space of the planter such that the upper edge of the sidewalls of the insert extend upwardly from the upper edge of the sidewalls of the planter. The method further includes placing and growing a plant matter within the interior space of the insert such that at least a portion of the plant matter extends upwardly from the upper edge of the plurality of sidewalls of the planter, positioning the planter proximate to at least one other planter, and allowing the insert to degrade from within the interior space of the planter such that the portion of the plant matter extending upwardly from the upper edge of the sidewalls of the planter abut a portion of the plant matter extending upwardly from an upper edge of the at least one other planter.

The present inventive green roof system provides coverage of an entire roof area quickly and economically by allowing the associated modules to be grown off-sight in a manner that allows the plant matter to extend upwardly from an associated planter and plant matter within adjacent modules to abut immediately upon installation. Further, the roof system is easy to install at a relatively low cost. Moreover, the system provides improved water communication and drainage between adjacent modules, allows easy maintenance of the overall system, can be installed easily and quickly by even unskilled personnel, is capable of a long-operating life, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 3 is an exploded perspective view of the planter module;

FIG. 4 is an enlarged perspective view of the planter module including a cut-away portion of the collar member inserted into the planter;

DETAILED DESCRIPTION OF THE PREFERRED EMBODIMENTS

Figure 2:
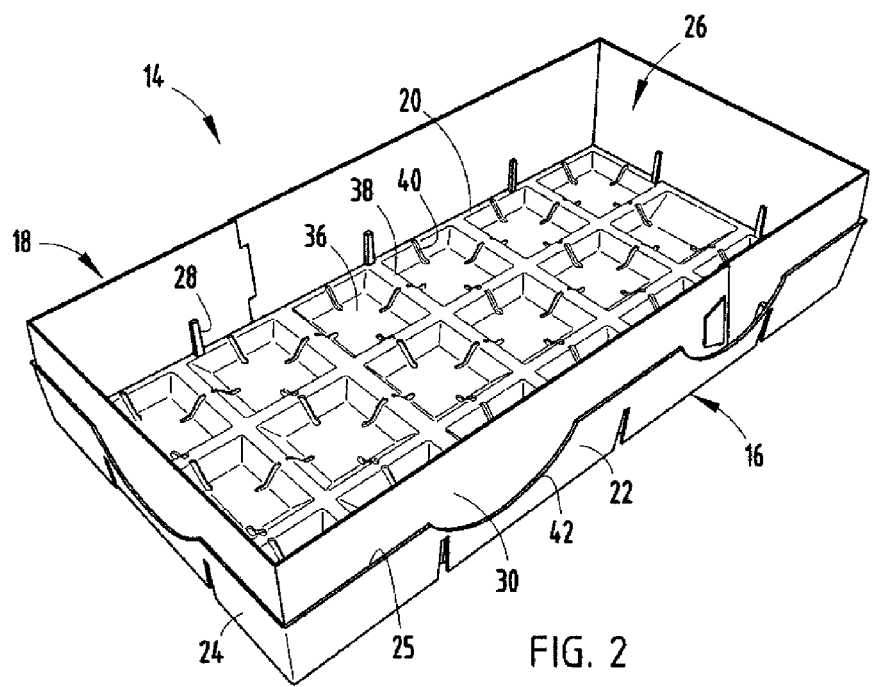
FIG. 2 is a perspective view of a green roof planter module that includes a collar member removably inserted into an associated planter.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
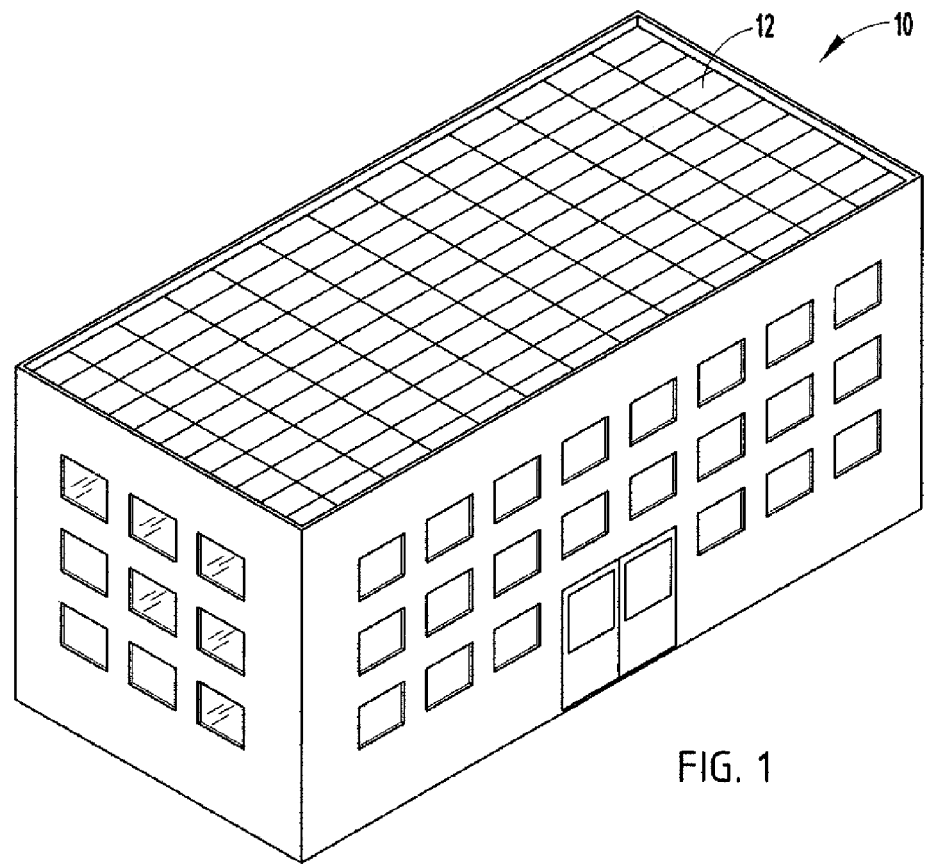
FIG. 1 is a perspective view of a building employing a green roof system embodying the present invention.

The reference numeral 10 (FIG. 1) generally designates a green roof system embodying the present invention and employed on a building roof 12 and comprising a plurality of individual green roof planter modules 14. In the illustrated example, each of the planter modules 14 (FIGS. 2 and 3) comprises a planter 16 and a removable collar 18 inserted into the planter 16 such that the collar 18 extends upwardly from an uppermost edge of the planter 16, thereby allowing the retention of plant matter that extends above an upper edge of the planter 16.

Figure 5A:
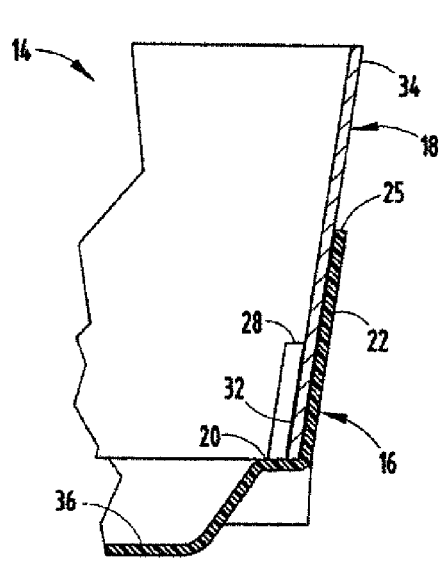
FIG. 5A is a partial cross-sectional end view of the planter module.
Figure 5B:
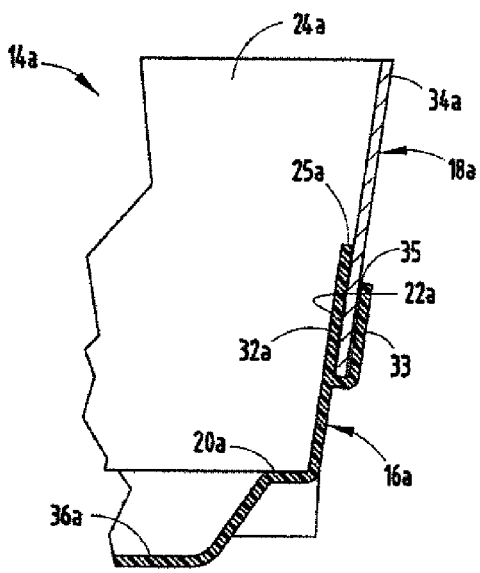
FIG. 5B is a partial cross-sectional end view of an alternative embodiment of the planter module.

Each planter 16 includes a bottom wall 20, a plurality of walls that include sidewalls 22 and end walls 24 that cooperate with the bottom wall 20 to form an interior space 26, and a plurality of support tabs 28 (FIGS. 4 and 5) spaced about the interior space 26 and that extend inwardly toward the interior space 26. Each of the sidewalls and end walls include a top edge 25. As best illustrated in FIG. 4, each of the support tabs 28 extends upwardly from the bottom wall 20 and is spaced from an associated sidewall 22 or end wall 24. The planter 16 is preferably integrally molded by press forming, and the like, and is constructed of a material such as plastic. In the illustrated example, the planter 16 is providing a rectangularly-shaped overall plan form, however, other configurations may also be utilized. Further, it is noted that the tabs 28 are configured to abut the bottom surface of the bottom wall 20 of another planter 16 when multiple planters are placed in a stacked relationship. As illustrated, one of the sidewalls 22 and one of the end walls 24 each include an outwardly-extending overlap tab 29 that overlaps a respective sidewall or end wall of an adjacent planter 16.

The collar member 18 includes a plurality of walls 30 each having a bottom edge 32 and a top edge 34. In the illustrated example, the collar member 18 comprises two pieces that extend in a rectangular manner about the planter 16. Specifically, the collar member 18 extends about the interior space 26 of the associated planter 16 such that the bottom edge 32 of each of the walls 30 is inserted between the sidewalls and end walls 22, 24 of the planter 16 and the associated support tabs 28, thereby retaining the collar member 18 within the interior space 26 of the planter 16, and such that the walls 30 of the collar member 18 extend upwardly from the top edge 25 of the sidewalls and end walls 22, 24 of the planter 16. Although locking tabs are illustrated between each of the pieces of the collar, overlapping, non-tabbed ends may also be utilized.

In operation, the collar member 18 is inserted into the interior space 26 of planter 16, in a manner described above, and a plant matter that comprises grown plants, plant seedlings, plant seeds and the like, and soil and/or aggregate is also inserted into the interior space 26 of the planter 16. Subsequently, plants are grown within the interior space 26 until such plant matter extends upwardly above the top edge 25 of the sidewalls and end walls 22, 24 of the planter 16. The planter module 14 is then placed in rows or a grid work-like pattern upon a roof 12 (FIG. 1) and the collar member 18 removed such that the plant matter within the interior space 26 of the planter 16 abuts similar plant matter in adjacent planter modules 14, thereby providing a connected roof system that will quickly provide an interconnected and aesthetically-pleasing planted surface. Alternatively, the collar member 18 comprises a biodegradable material that may be left within the planter 16 placed within the overall grid work of the green roof system 10. It is also noted that the walls 30 of the collar member 18 angles outwardly from the sidewalls and end walls 22, 24 of the planter 16, thereby promoting a tight abutment of the plant matter extending above the top edge 25 of the sidewalls and end walls 22, 24 between adjacent planter modules 14.

The proper communication of water between adjacent planters 16 is provided by various elements within the planter 16. As best illustrated in FIG. 2, the bottom wall 20 of the planter 16 comprises a grid work-like pattern of recesses 36 segmented by raised portions 38. A plurality of drainage apertures 40 extend through the recesses 36 and the raised portions 38. It is noted that at least a portion of each of the drainage apertures 40 extend through a lowermost portion of the bottom wall 20, thereby eliminating standing water within the planter 16. Each of the sidewalls and end walls 22, 24 of the planter 16 also include arcuately-shaped recesses or apertures 42 extending therethrough that align with similar apertures of adjacent planters when positioned within the overall gridwork. As illustrated, each of the apertures extends downwardly from the top edge 25 of the sidewalls and end walls 22, 24, a distance that is greater than half of the distance between the top edge 25 and a point at which the bottom wall 20 intersects the sidewalls and/or end wall 22, 24, thereby providing adequate water communication between adjacent planters 16 and further allowing for the migration of plant matter therebetween.

The reference numeral 14a (FIG. 5B) generally designates another embodiment of the present inventive planter module. Since the planter module 14a is similar to the previously-described planter module 14, similar parts appearing in FIGS. 2-4 and FIG. 5, respectively are represented by the same, corresponding reference numeral, except for the suffix "a" in the numerals of the latter. In the planter module 14a, the top edge 25a of each of the sidewalls 22a and end walls 24a include an upwardly-opening channel 33 defining a pocket 35 within which the bottom edge 32a of the collar member 18a is inserted.

Figure 6:
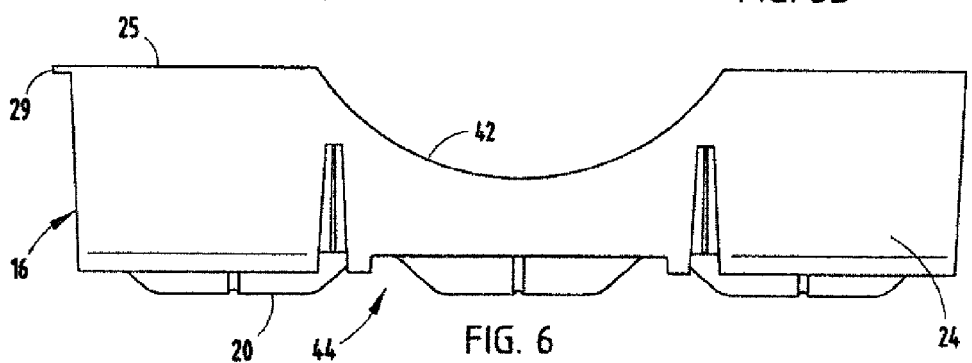
FIG. 6 is an end view of the planter.

The planter 16 (FIG. 6) further includes a pair of gripping reliefs 44 located at each end thereof. Specifically, each relief 44 is provided within the intersection of an associated end wall 24 and the bottom wall 20 such that a user is able to insert their fingers into the reliefs 44, thereby allowing easy gripping and support of the planter module 14.

Figure 7:
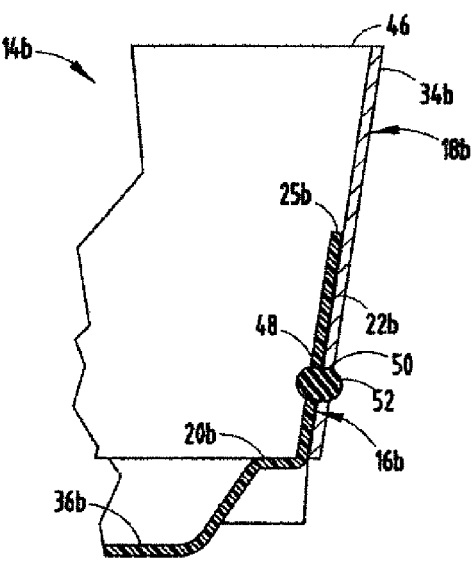
FIG. 7 is a partial cross-sectional view of another alternative embodiment of the planer module.

The reference numeral 14b (FIG. 7) generally designates another embodiment of the present inventive planter module 14. Since the planter module 14b is similar to the previously-described planter module 14, similar parts appearing in FIGS. 2-4 and FIG. 7, respectively are represented by the same, corresponding reference numeral, except for the suffix "b" in the numerals of the latter. In the planter module 14b, the intersecting corner 46 between the sidewalls 22b and the end walls (not shown) are provided with an aperture 48 extending therethrough, while corresponding corners of the collar member 18b are provided with an aperture or recess 50. The alternative embodiment planter module 14b further includes a retainer member that extends about the exterior of the sidewalls and end wall 22b, 24b of the planter 16b and extends into the aperture 48 of the planter 16b and the apertures 50 of the collar member 18b, thereby retaining the collar member 18b to the outside of the planter 16b. It is preferred that the retainer member 52 comprises an elastically-deformable material, such as an elastic cord or rubber band. The retainer member 52 assists in retaining the collar member 18b about the planter 16b, but allows easy removal of the retaining member 52 and the collar member 18b from about the planter 16b.

Figure 8:
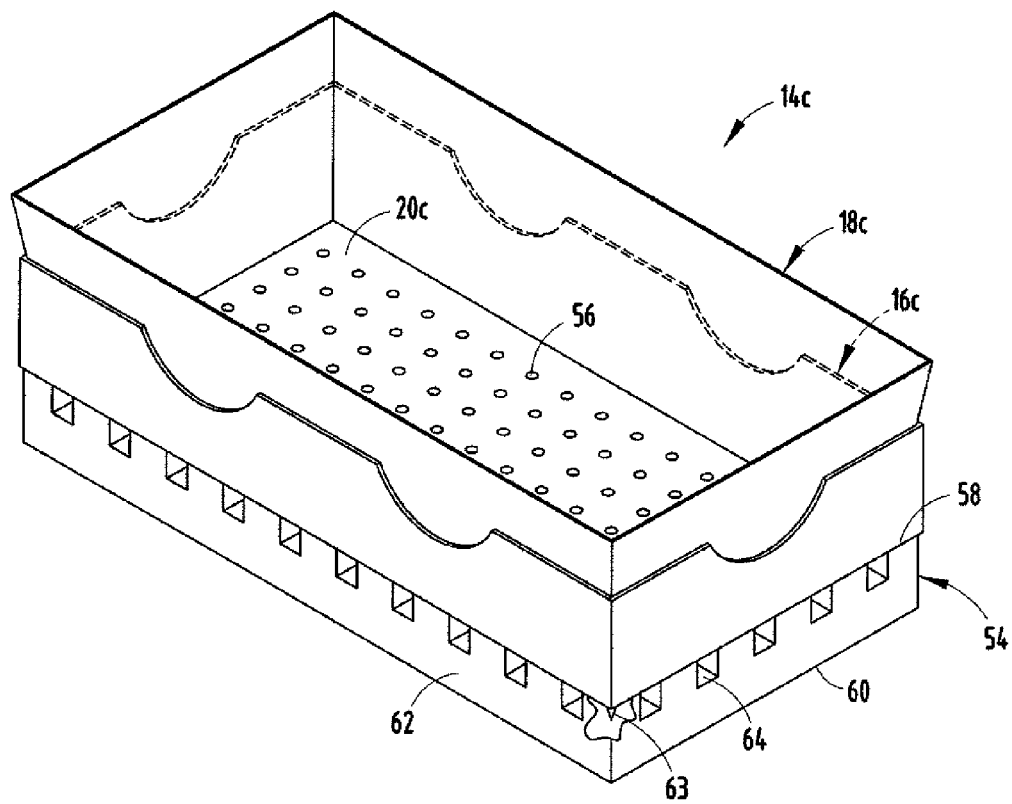
FIG. 8 is a top perspective view of another alternative embodiment of the planter module including a planter and a supporting drainage member.
Figure 9:
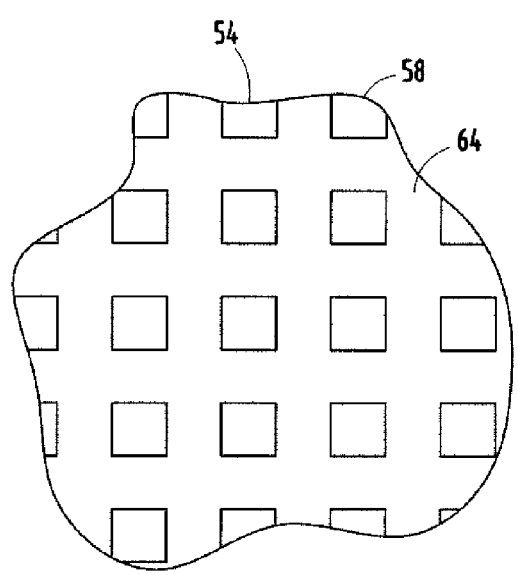
FIG. 9 is a top plan view of the drainage member.
Figure 10:
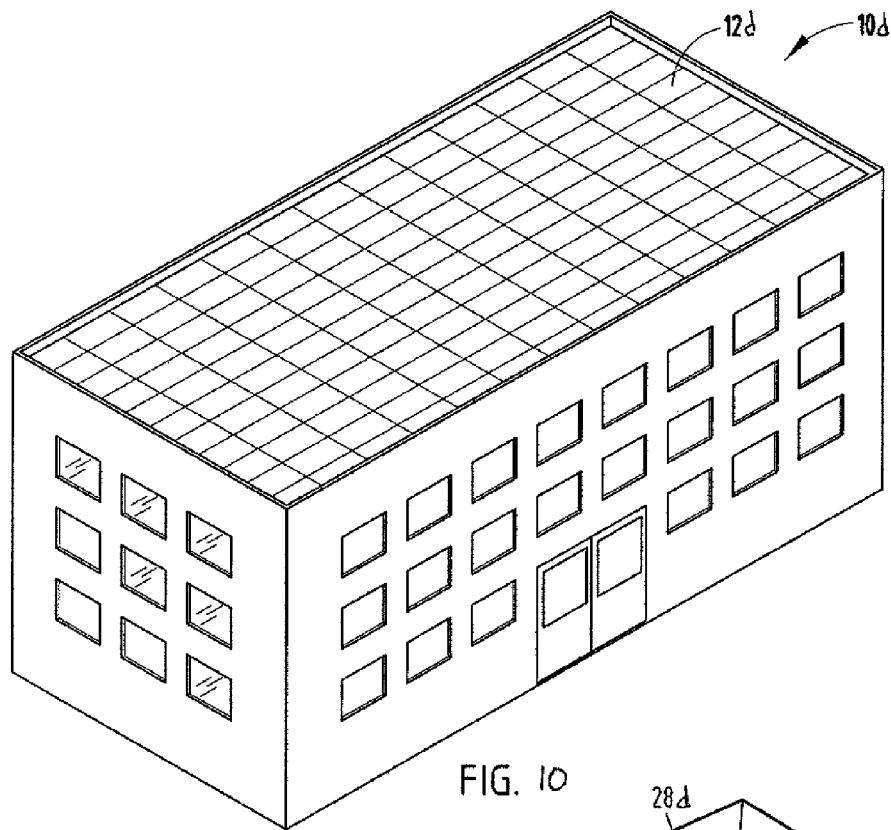
FIG. 10 is a perspective view of a building employing a green roof system embodying the present invention.

The reference numeral 14c (FIG. 8) generally designates another embodiment of the present inventive planter module. Since the planter module 14c is similar to the previously-described planter module 14, similar parts appearing in FIGS. 2-4 and FIGS. 8 and 9, respectively are represented by the same, corresponding reference numeral, except for the suffix "c" in the numerals of the latter. The planter module 14c includes a planter 16c, a collar member 18c, and a drainage member 54 supporting the planter 16c. The planter 16c and collar member 18c are similar to the previously-described planter 16 and collar member 18, the most notable exception being that the bottom wall 20c of the planter 16c is substantially flat with a plurality of drainage holes or apertures 56 extending therethrough. The drainage member 54 is provided substantially the same plan form shape as the planter 16c and includes a top wall 58, a bottom wall 60, and a plurality of sidewalls 62. As illustrated, the planter 16c includes a plurality of downwardly-extending pegs 63 that are embedded into the drainage member 54. As best illustrated in FIG. 9, the top wall 58 includes an inwardly-extending grid work of passages or recesses 64. These passages extend between and through the sidewalls 62 of the drainage member 54. In assembly, the bottom wall 20c of the planter 16c is supported on the top wall 58 of the drainage member 54 such that the drainage apertures 56 of the planter 16c aligns with the recesses 64 of the drainage member 64, thereby allowing water communication therebetween. Further, the recesses 64 of the drainage member 54 are arranged so as to align the recesses 64 of adjacent drainage members 54 within the overall grid work of planter modules 14c when placed upon the roof 12 of the associated building, thereby allowing proper fluid communication between all adjacent planter modules 14c. Preferably, the drainage member 54 is comprised of a deformable foam material that allows the bottom wall 60 to be easily deformed when placed upon an uneven roof surface thereby eliminating the need for blocking or altering any of the planters 16c. The foam material also provides insulative properties between the planters 16c and associated roof 12.

The reference numeral 10d (FIG. 10) generally designates another embodiment of the green roof system embodying the present invention and employed on a building roof 12d and comprising a plurality of individual green roof planter modules 14d. Since the green roof system 10d is similar to the previously described green roof system 10, similar parts appearing in FIGS. 1-5a and FIGS. 10-14 are represented by the same corresponding numeral, except for the suffix "d" in the numerals of the latter. In the illustrated example, each of the planter modules 14d (FIGS. 11 and 12) comprises a planter 16d and a biodegradable collar 18d in-molded within the planter 16d such that the collar 18d extends upwardly from an uppermost edge 17d of the planter 16d, thereby allowing the retention of plant matter that extends above the uppermost edge 17d of the planter 16d.

Figure 13:
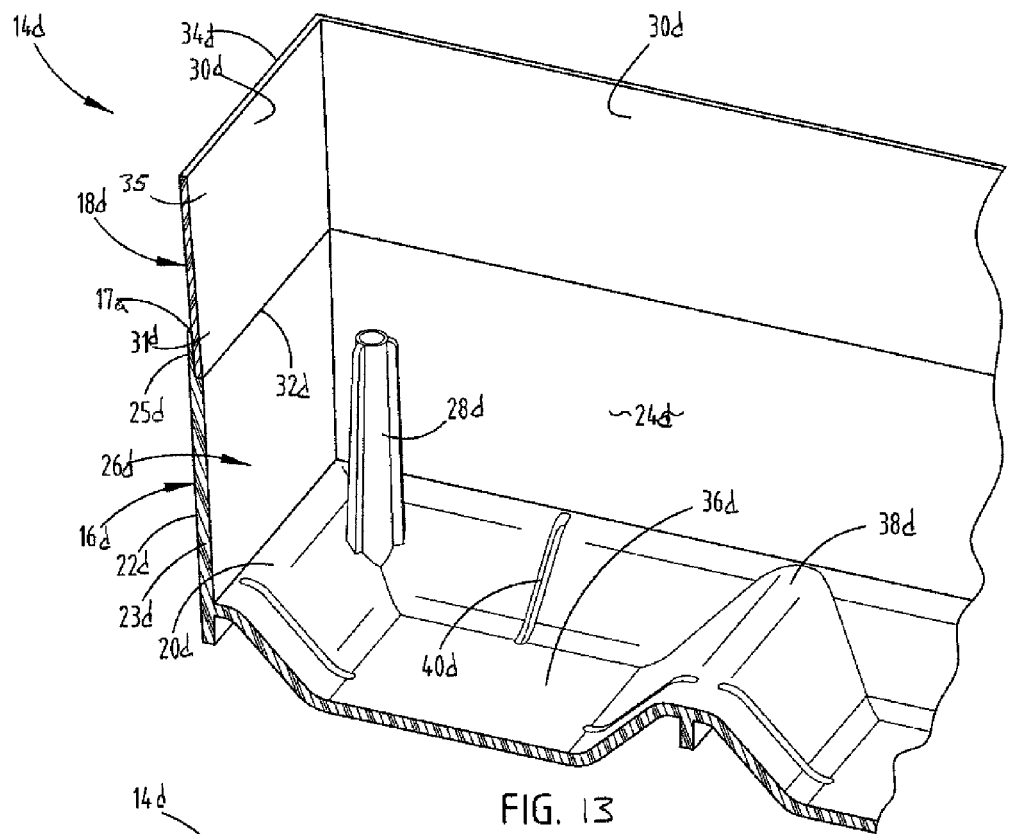
FIG. 13 is an enlarged perspective view of the planter module including a cut-away portion of the collar member in-molded the planter.
Figure 14:
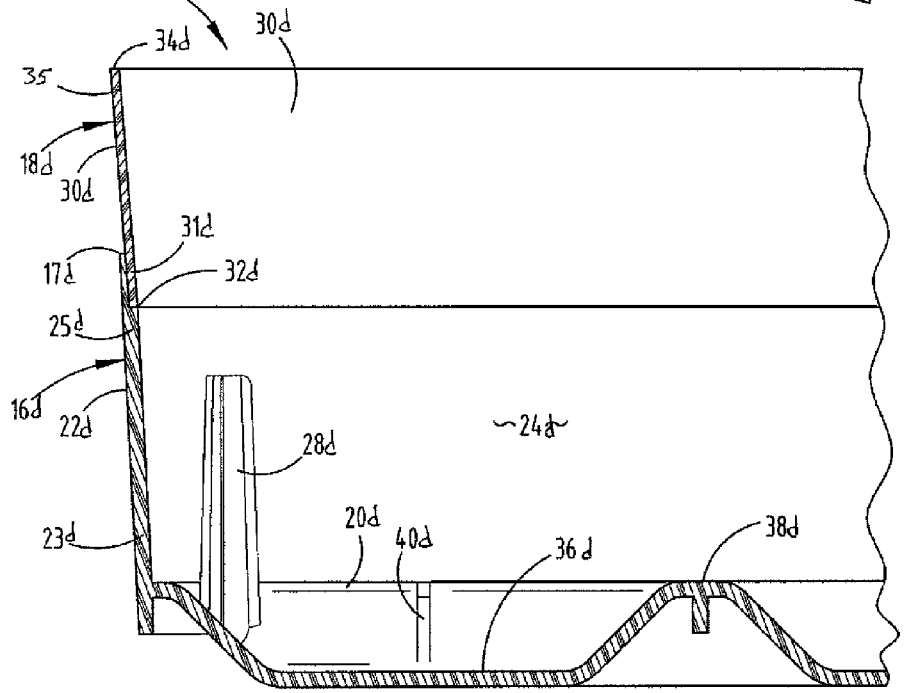
FIG. 14 is a partial cross-sectional end view of the planter module.

Each planter 16d includes a bottom wall 20d, and a plurality of walls that include sidewalls 22d and end walls 24d (all generally referred to herein as sidewalls) each including a bottom portion 23d and an upper portion 25d that cooperate with the bottom wall 20d to form an interior space 26d. Each of the sidewalls and end walls include an uppermost or top edge 17d. As best illustrated in FIGS. 13 and 14, the planter 16d includes a plurality of spacing tabs 28d that extend upwardly from the bottom wall 20d for spacing stacked planters 16d from one another as described herein. The planter 16d is preferably integrally molded by press forming, and the like, and is constructed of a material such as plastic. In the illustrated example, the planter 16d is providing a rectangularly-shaped overall plan form, however, other configurations may also be utilized. Further, it is noted that the tabs 28d are configured to abut the bottom surface of the bottom wall 20d of another planter 16d when multiple planters are placed in a stacked relationship.

The collar member 18d includes a plurality of walls 30d each having a bottom portion 31d with a bottom edge 32d and top portion 35d with a top edge 34d. In the illustrated example, the collar member 18d comprises two pieces that extend in a rectangular manner about the planter 16d, and is constructed of a biodegradable material such as fiber products, paper products, wood products, biodegradable plastics, and the like. Specifically, the collar member 18d extends about the interior space 26d of the associated planter 16d such that the bottom portion 31d of each of the walls 30d is in-molded within the upper portion 25d of each of the sidewalls and end walls 22d, 24d of the planter 16d, thereby securing the biodegradable collar member 18d within the interior space 26d of the planter 16d, and such that the walls 30d of the collar member 18d extend upwardly from the top edge 17d of the sidewalls and end walls 22d, 24d of the planter 16d. The collar member 18d is in-molded within the planter 16d to form a single, integral unit which may be formed by placing the collar member 18d within an associated mold prior to forming the planter 16d via a press-forming process, blow molding process, injection molding process or other forming process known in the art.

In operation, a plant matter that comprises grown plants, plant seedlings, plant seeds and the like, and soil and/or aggregate is inserted into the interior space 26d of the planter 16d. Subsequently, plants are grown within the interior space 26d until such plant matter extends upwardly above the top edge 17d of the sidewalls and end walls 22d, 24d of the planter 16d. The planter module 14d is then placed in rows or a grid work-like pattern upon a roof 12d (FIG. 10), where the biodegradable collar member 18d quickly degrades such that the plant matter within the interior space 26d of the planter 16d abuts similar plant matter in adjacent planter modules 14d, thereby providing a connected roof system that will quickly provide an interconnected and aesthetically-pleasing planted surface. It is also noted that the walls 30d of the collar member 18d angles outwardly from the sidewalls and end walls 22d, 24d of the planter 16d, thereby promoting a tight abutment of the plant matter extending above the top edge 17d of the sidewalls and end walls 22d, 24d between adjacent planter modules 14d.

Figure 11:
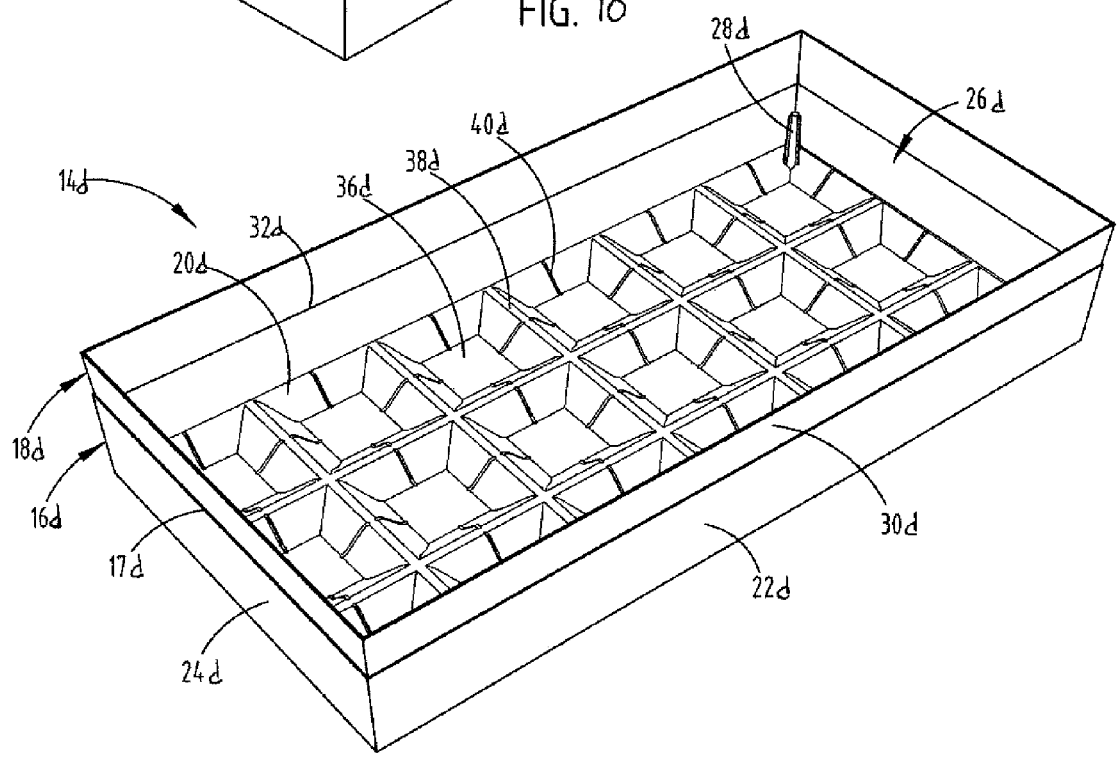
FIG. 11 is a perspective view of a green roof planter module that includes a biodegradable collar member in-molded within an associated planter.
Figure 12:
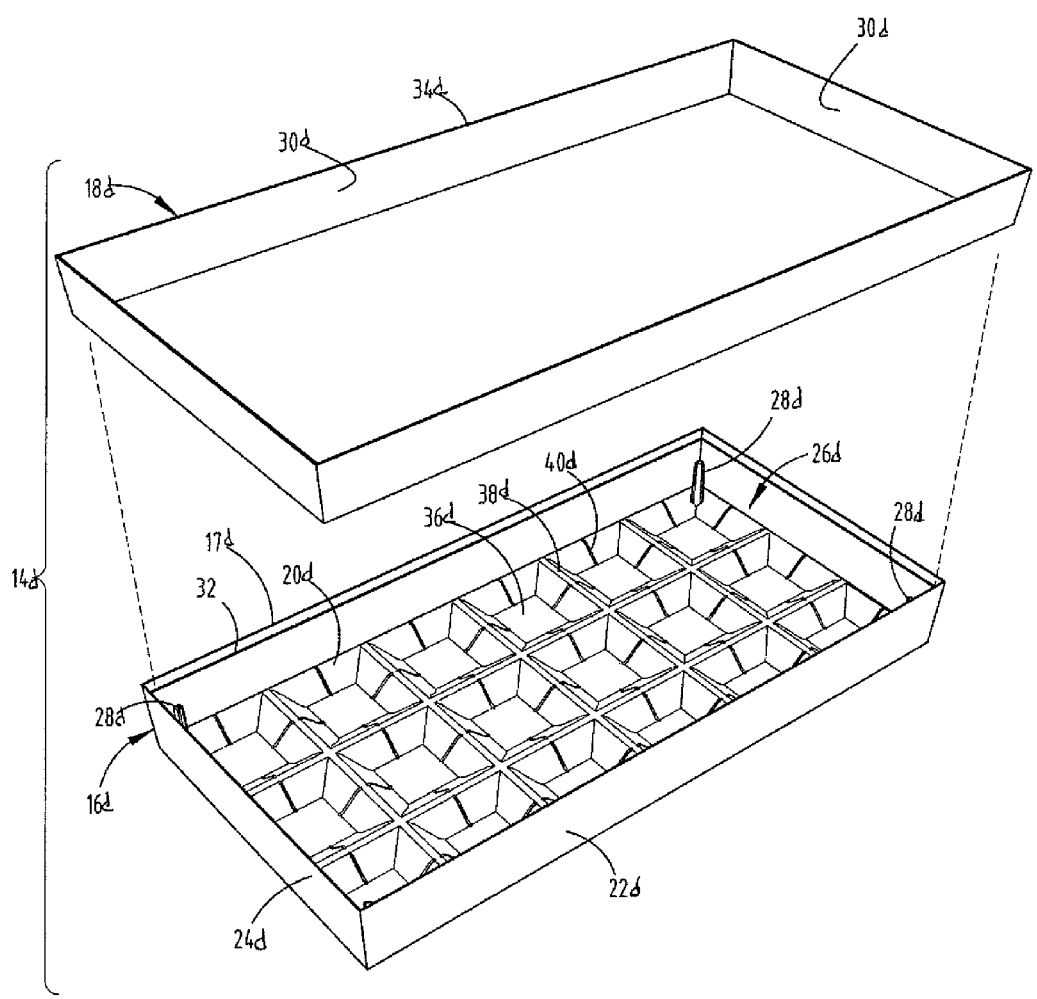
FIG. 12 is an exploded perspective view of the planter module.

The proper communication of water between adjacent planters 16d is provided by various elements within the planter 16d. As best illustrated in FIG. 11, the bottom wall 20d of the planter 16d comprises a grid work-like pattern of recesses 36d segmented by raised portions 38d. A plurality of drainage apertures 40d extends through the recesses 36d and the raised portions 38d. It is noted that at least a portion of each of the drainage apertures 40d extend through a lowermost portion of the bottom wall 20d, thereby eliminating standing water within the planter 16d. Each of the sidewalls and end walls 22d, 24d of the planter 16d also include arcuately-shaped recesses or apertures 42d extending therethrough that align with similar apertures of adjacent planters when positioned within the overall gridwork. As illustrated, each of the apertures extends downwardly from the top edge 17d of the sidewalls and end walls 22d, 24d, a distance that is greater than half of the distance between the top edge 17d and a point at which the bottom wall 20d intersects the sidewalls and/or end wall 22d, 24d, thereby providing adequate water communication between adjacent planters 16d and further allowing for the migration of plant matter therebetween.

The present inventive green roof system provides coverage of an entire roof area quickly and economically by allowing the associated modules to be grown off-sight in a manner that allows the plant matter to extend upwardly from an associated planter and plant matter within adjacent modules to abut immediately upon installation. Further, the roof system is easy to install at a relatively low cost. Moreover, the system provides improved water communication and drainage between adjacent modules, allows easy maintenance of the overall system, can be installed easily and quickly by even unskilled personnel, is capable of a long-operating life, and is particularly well adapted for the proposed use.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

The invention claimed is:

1. A modular green roof system, comprising:
    a planter including a bottom wall and a plurality of sidewalls that cooperate with the bottom wall to form an interior space, and
    a biodegradable insert within the interior space of the planter including a plurality of sidewalls that cooperate with one another to form an interior space, wherein the insert is adapted to retain a plant matter in the interior space of the insert, the plurality of sidewalls of the insert extending above the plurality of sidewalls of the planter, wherein the plurality of the sidewalls of the insert are adapted to retain a plant matter that extends about the plurality of sidewalls of the planter, and wherein the planter is coupled to a substantially similar adjacent planter.

2. The modular green roof system of claim 1, wherein the plurality of sidewalls of the insert angle outwardly from the plurality of sidewalls.

3. The modular green roof system of claim 1, wherein the planter comprises a molded plastic.

4. The modular green roof system of claim 1, wherein at least one of the sidewalls of the planter includes an outwardly-extending tab that is adapted to overlap with a sidewall of the adjacent planter.

5. The modular green roof system of claim 1, wherein the insert comprises at least a select one of a group including wood, cellulose, biodegradable plastic, and paper.

6. The modular green roof system of claim 1, wherein the insert is at least partially coated with a material that retards biodegradation.

7. A method for installing a modular green roof system, comprising:
    providing a planter that includes a bottom wall and a plurality of sidewalls each having an upper edge and that cooperate with the bottom wall to form an interior space;
    providing a biodegradable insert that includes a plurality of sidewalls each having an upper edge and that cooperate with one another to form an interior space;
    inserting the insert into the interior space of the planter such that the upper edge of the sidewalls of the insert extend upwardly from the upper edge of the sidewalls of the planter;
    placing and growing a plant matter within the interior space of the insert such that at least a portion of the plant matter extends upwardly from the upper edge of the plurality of sidewalls of the planter;
    positioning the planter proximate to at least one other planter that is substantially similar to the positioned planter, such that the positioned planter and the at least one other planter are coupled to one another; and
    allowing the insert to degrade from within the interior space of the planter such that the portion of the plant matter extending upwardly from the upper edge of the sidewalls of the planter abut a portion of plant matter extending upwardly from an upper edge of the at least one other planter.

8. The method of claim 7, wherein the step of inserting the insert includes inserting the insert such that the sidewalls of the insert angle outwardly from the sidewalls of the planter.

9. The method of claim 8, wherein the step of providing the planter includes providing the planter as comprising a molded plastic.

10. The method of claim 9, wherein the step of providing the planter further includes providing at least one of the sidewalls of the planter with an outwardly-extending tab that is adapted to overlap with a sidewall of an adjacent planter.

11. The method of claim 10, wherein the step of providing the insert includes providing the insert as comprising at least a select one of a group including wood, cellulose, biodegradable plastic, and paper.

12. The method of claim 11, wherein the step of providing the insert further includes providing the insert as at least partially coated with a material the retards biodegradation.

13. The method of claim 7, wherein the step of providing the planter includes providing the planter as comprising a molded plastic.

14. The method of claim 7, wherein the step of providing the planter further includes providing at least one of the sidewalls of the planter with an outwardly-extending tab that is adapted to overlap with a sidewall of an adjacent planter.

15. The method of claim 7, wherein the step of providing the insert includes providing the insert as comprising at least a select one of a group including wood, cellulose, biodegradable plastic, and paper.

16. The method of claim 7, wherein the step of providing the insert further includes providing the insert as at least partially coated with a material the retards biodegradation.

* * * * *